(No Model.)
T. W. CORBY.
COLTER AND PLOW CLEANER.
No. 324,817. Patented Aug. 25, 1885.
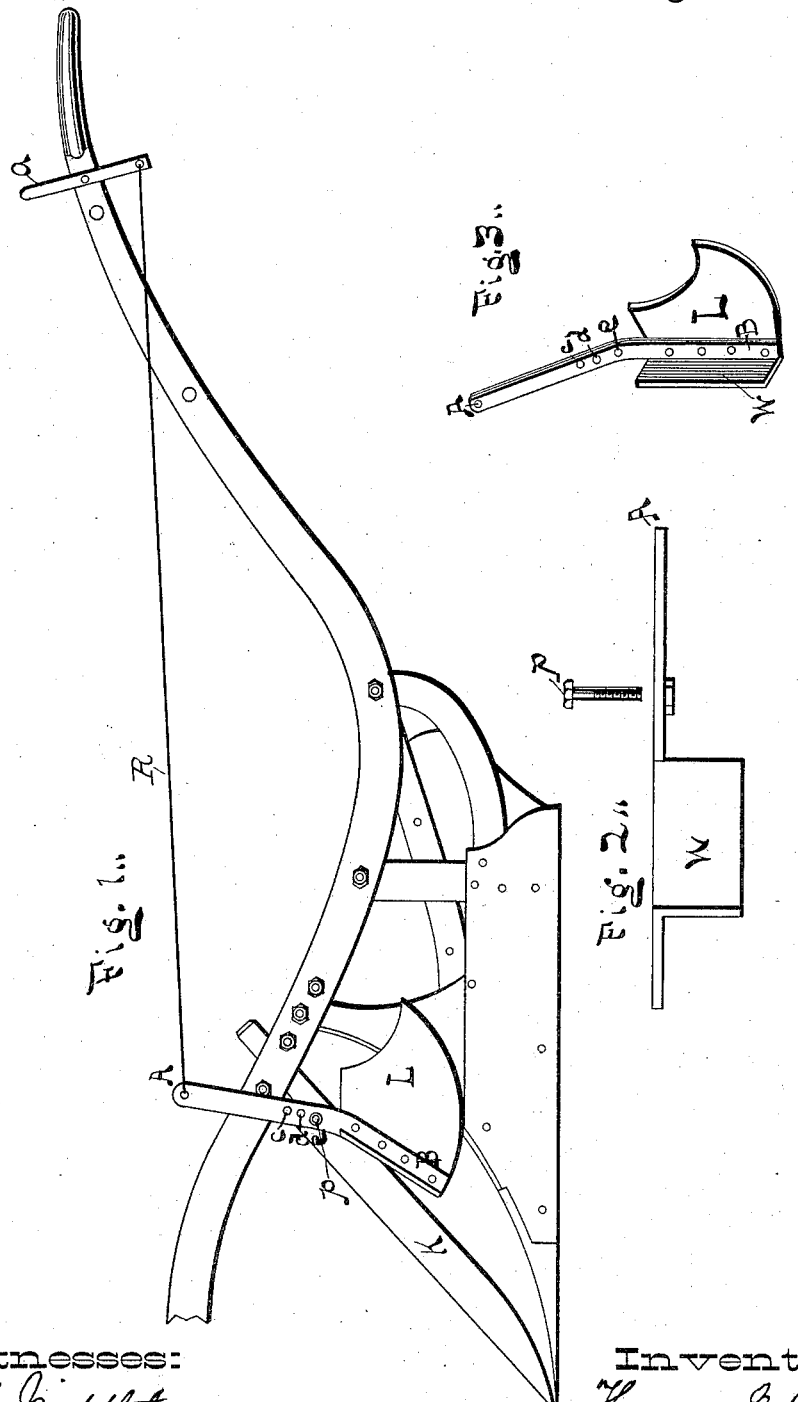
Witnesses:
F. L. Middleton
I. E. Middleton
Inventor:
Thomas W. Corby
By Ellis Spear
Atty

UNITED STATES PATENT OFFICE.

THOMAS W. CORBY, OF GROSSE POINT, MICHIGAN.

COLTER AND PLOW-CLEANER.

SPECIFICATION forming part of Letters Patent No. 324,817, dated August 25, 1885.

Application filed November 25, 1884. (No model.)

*To all whom it may concern:*

Be it known that I, THOMAS W. CORBY, of Grosse Point, in the county of Wayne and State of Michigan, have invented a new and useful Improvement in Colters and Plow-Cleaners; and I hereby declare that the following is a full, clear, and exact description thereof, which will enable others skilled in the art to make and use the same, reference being had to the accompanying drawings, which form a part of this specification.

Figure 1 represents a side view of a plow with a colter thereon to which is attached my cleaner. Fig. 2 shows a front view of my cleaner; Fig. 3, a perspective from the rear.

Through an ordinary knife-colter, at a short distance below the point where it is attached to the beam, I make a perforation. Upon a bolt passing through this perforation I hang my cleaner. This is made of a curved iron bar. (Shown at B C in the drawings.) Through the bar I make several perforations, $c$ $d$ $e$, each of which is adapted to receive the bolt $p$, and thus enable me to adjust the height of the cleaner from the ground or bottom of the landside of the plow, as may be desired, or according to the depth which it is intended to have the plow enter the ground, the proper adjustment being such that the bottom of the cleaner shall be just above the surface of the ground at the line where the surface comes against the landside of the plow. The bar itself, A B, is curved, with its concavity in front, so that the portion below the pin or bolt $p$ may lie alongside of and have its forward edge slightly behind the knife-edge of the colter, while the portion above the bolt $p$, bending forward, approximates to a perpendicular. To the lower part of the bar A B, from near its middle, I attach a plate of peculiar shape. (Shown in the drawings at L.) This is attached to the side of the bar A B next to the colter, and when mounted upon the colter lies close against the colter and landside of the plow. The bottom edge of this plate L is swung back and forth upon the bolt $p$, its lowest point being constantly close to the ground, and thus does not allow the accumulation of rubbish between itself and the colter or front edge of the plow. The forward edge I turn around the front of the swinging bar A B and extend out to the landside, so as to form a wide wing. The rear edge, from the top of the plate to the extreme point of L, I make concave, as I am thus enabled to have a smaller angular opening in any position of the plate between the rear edge thereof and the forward edge of the plow, and the motion of one upon the other acts like a shears to cut any small roots or weeds that may have gathered upon the forward edge of the plow. The broad wing W, acting upon rubbish that may have gathered over the colter, has a tendency to throw the same to the mold-board side of the plow.

To the upper end of the swing-bar A B, I attach a rod, R, which is carried back and attached to a handle pivoted upon the plow-handle.

I am aware that plow-cleaners have heretofore been hung from the plow-beam, or an extension from the plow-beam, and operated by a rod passing back to the hand of the plowman; and I do not make any broad claim for a cleaner of that character.

What I do claim as novel, and desire to have secured to me by Letters Patent, is—

1. In combination with the colter of a plow, an arm pivoted directly to said colter and adapted to swing upon its pivot, and having upon its lower end a plate with its lower edge curved, so that its lowermost point is nearly coincident with the surface of the ground, while the forward edge swings through a considerable angle.

2. In combination with the colter and a swinging arm pivoted thereto, a plate having an extension rearward beyond the forward edge of the plow, and having its forward edge extended in a wing to the landside.

3. In combination with the colter, a swinging arm pivoted thereto, a plate attached to said swinging arm, having its lower edge curved with the convexity downward, its rear edge curved with the concavity forward, and its forward edge turned around the swinging arm and extending to the landside in a wing, substantially as described.

THOMAS W. CORBY.

Witnesses:
CHARLES F. BURTON,
R. A. PARKER.